May 16, 1933. M. D. SPIRIDI 1,909,907
SOLID TIRE COMPRESSED AIR WHEEL
Filed Sept. 16, 1931
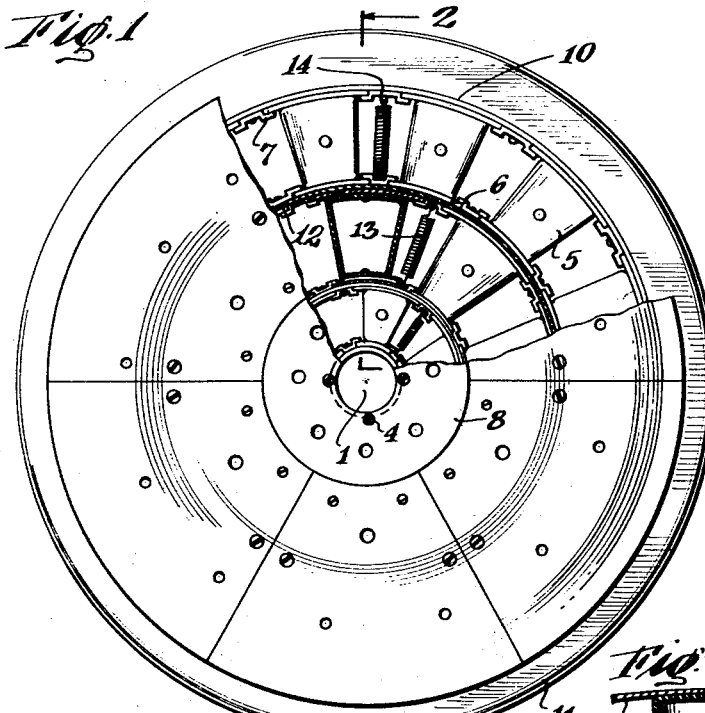
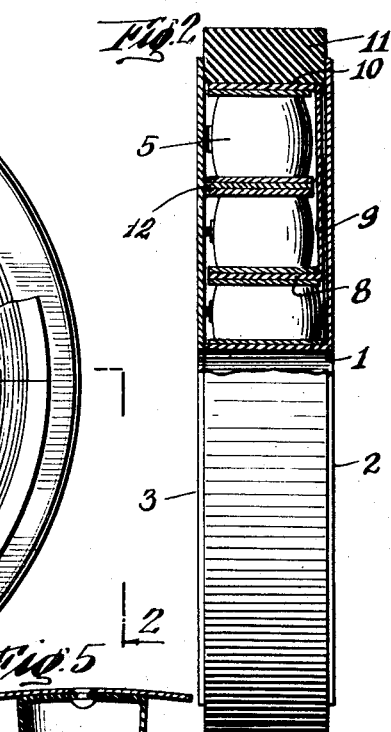
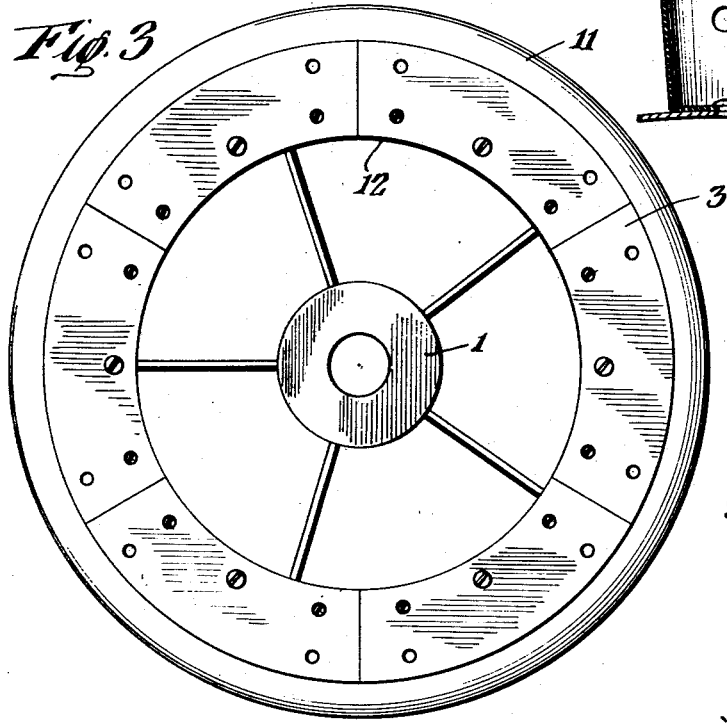
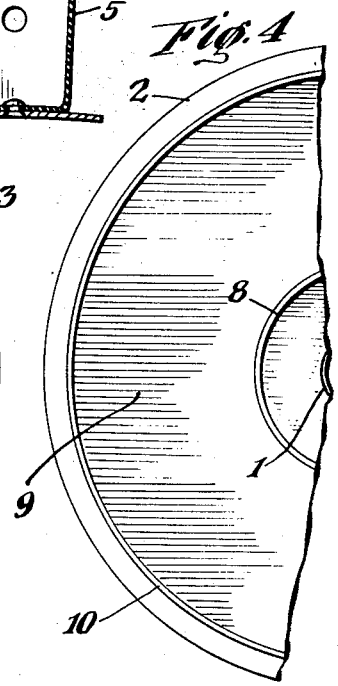
INVENTOR
Michael D Spiridi Patented May 16, 1933

1,909,907

UNITED STATES PATENT OFFICE

MICHAEL D. SPIRIDI, OF NEW YORK, N. Y.

SOLID TIRE COMPRESSED AIR WHEEL

Application filed September 16, 1931. Serial No. 563,124.

The objects of this improvement are: to provide a durable automobile wheel without blowouts or flat tire, comfort in driving, no danger from glass or nails, economy in tires and no extra emergency wheel is needed to be carried along.

This invention particularly relates to a solid tire compressed air automobile wheel, comprising a stationary section and a movable section, the stationary section composed of the hub and of two outer plates, one of the outer plates is of one part, and the other of plurality of parts and perforated, to which plate said hub is secured and which carries also an intermediate rim concentrically arranged to the hub. The movable section is composed of an inner plate carrying an outer rim to which the tire is secured and an inner rim concentric to the hub and arranged to move with said inner plate while engaging in the space between said intermediate rim and the hub, while the outer rim is displaceable against said intermediate rim, to be cushioned by the compressed air in the rubber bags between the rims to form an air cushion.

A plurality of either square, elongated or barrel shaped rubber bags, full of air, are provided, to each of which are secured if desired, at its outer and inner ends to two thin springy metal strips, which are in turn inserted between two outer and two inner spring holders, mounted at circumferentially spaced points on the inner face of the outer rim the inner and outer faces of the intermediate and the inner rims and on the outer face of the hub. The said rubber bags are arranged in close proximity to one another, in circumference of the rims in the chambers formed between the rims, compressed air being supplied into the rubber bags before or through the perforation of the outer plate in communication with an air valve from the side of each rubber bag. To renew the worn rubber bags, one or more parts of the outer plate are removed outwardly therefrom one which will be replaced after the renewal of the worn bag without taking apart the wheel or the tire. The same construction of an outer plate in parts and rubber bags between two rims, is applicable to a wheel with wire or wooden spokes and with two rims of which the outer rim is movable, and the other, the inner rim is stationary and is secured to the spokes. The one with plurality of rims may be used for trucks and the one with two rims and spokes may be used for passenger cars. If desired, emergency coil springs, rubber plates, or spongy rubber blocks, may be used at intervals between rubber bags, connecting the rims. A single worn rubber bag between rims is harmless to the wheel and meanwhile renewable. For this reason, rubber bags are used instead of rubber tubes between the rims. The tubes when soiled, being of one piece, are apt to cause a flat tire, although individual rubber bags between steel walls of outer plates could not be blown out by the pressure of weight, and yet worn ones are changeable without causing flat tire. The springs are covered with rubber tubes for the protection of the rubber bags, and placed at intervals between the rubber bags. The construction of this wheel may be made of wood or light metal.

In the accompanying drawing:

Fig. 1 is a side view of the wheel with a portion of one outer plate, removed so as to show the wheel interior.

Fig. 2 is an edge view of the wheel partly in diametrical transverse section on line 2—2 of Fig. 1.

Fig. 3 is a side view of a wheel with spokes and with two rims being used.

Fig. 4 is a side view of the inner and outer rims showing the connections of the inner plate to the outer and inner rims, the intermediate rim being removed as integral to an outer plate.

Fig. 5 is a sectional detail view of a rubber bag on an enlarged scale.

To opposite sides of the hub "1", two radially extending outer metal plates "2" and "3" are secured by bolts "4". Square or elongated rubber bags 5 are provided which are attached at their outer and inner ends to square or elongated springy thin metal strips 6, the extended ends of each of which strips are inserted between two steel spring holders 7 secured on the rims to hold the rubber bags in place by means of said metal strips. The said steel spring holders are mounted a little apart from one another in circumference on the inner face of the outer rim the inner and the intermediate rims and on the outer periphery of the hub and intermediate and inner rims.

The said rubber bags are arranged in close proximity to one another in circumference of the inner rim and hub also into the chambers formed between the rims, and are changeable when worn by pulling them out from both ends of their springy metal strips and releasing same from between the spring holders. The inner rim "8" is attached to a plate "9" carrying the outer rim "10" carrying the solid rubber tire "11" by means of the usual tire securing means, and engaged by the outer plates "2" and "3". The hub "1" and an intermediate rim "12" between rims "8" and "10" are secured to an outer plate "3" so that rim "12" is concentrically spaced from the outer rim "10" and inner rim "8" by means of rubber bags "5", and at intervals with emergency coil springs "13" respectively radially disposed between said rims and secured to same by hook or wire "14" and the rubber bags connected by springy metal strips "6" and steel spring holders "7". Plate "3" has a plurality of air holes and parts, or it may be a one piece removable plate, and is rigid with the hub through which bolts or the like pass holding outer plates "2" and "3" together. The solid rubber tire is conveniently renewed by letting the air go free from the few rubber bags between rims and after renewal of the tire, the air will be recompressed to the same rubber bags again, without taking the wheel apart. The device operates as follows:

Under the load of the vehicle the inner plate "9" and its rim "10" as well as inner rim "8" integral with plate "9" will be displaced against the intermediate rim "12" and the hub and compress the rubber bags full of compressed air between them to form an air cushion making the wheel resilient while compressed air is introduced in rubber bags through the air openings in plates "3" communicating with the side air valve of the rubber bags, which are then closed by means of screws or the like.

It will be understood that I may make such changes in my invention as come within the scope of the appended claims without departure from the spirit of my invention.

Having thus described my invention what I claim as new and desire to secure by Letters Patent is:

1. A resilient compressed air wheel composed of two sections, a stationary section and a movable section, concentric to one another, said stationary section comprising a hub, two outer plates to which said hub is secured, one of which is perforated for the supply of compressed air, and an intermediate rim concentric to said hub and attached to said perforated outer plate, the movable section comprising an inner plate, an outer rim secured to said plate, a tire secured to said rim and an inner rim on said plate adapted to engage in the space between said intermediate rim and said hub, and means to yieldingly connect the concentric rims and hub comprising a plurality of elongated compressed air rubber bags receiving their supply of compressed air through the perforations in said perforated outer plate and provided with springy thin metal strips attached on opposite circumferential sides of said bags, said strips being inserted within steel spring holders, which are mounted on the confronting peripheries of said rims and hub.

2. A resilient compressed air wheel composed of a plurality of sections, a stationary section and a movable section, concentric to one another, said stationary section comprising a hub, outer plates connected therewith and an inner rim connected to one of the outer plates, and with said hub, said movable section comprising an outer rim carrying a tire and engaging in the space between the outer plates and the inner rim, and compressed air bags and emergency springs mounted between the confronting peripheries of the inner and outer concentric rims, the emergency springs being covered with rubber tubes for the protection of the rubber bags, one of the outer plates being perforated for the supply of compressed air to the rubber bags and being in a plurality of parts to facilitate renewal of the rubber bags when worn.

3. In a resilient compressed air wheel, a hub, outer plates to which said hub is connected, one of which is perforated, an intermediate rim connected to said perforated outer plate, an outer rim carrying a tire, an inner plate to which said outer rim is connected, and an inner rim connected with said inner plate and spaced from said outer rim, the space between said inner and outer rims adapted to receive said intermediate rim to be displaced therein under load, resilient connections comprising compressed air rubber bags mounted between the confronting peripheries of the hub and rims and receiving their supply of compressed air through the perforations in said perforated outer plate, one of said outer plates being in a plurality of parts to facilitate the renewal of said rubber bags when worn.

4. In a resilient compressed air wheel, a hub, an outer removable plate to which said hub is attached, an intermediate rim concentrically arranged with respect to said hub and secured on said outer plate, an inner plate and an outer plate engaging said inner plate and secured to the hub opposite to said outer removable plate, an outer rim on said inner plate and fixed thereto, a tire secured to said outer rim, an inner rim also fixed to said inner plate, adapted to engage movably in the space between the intermediate rim and the hub to freely move therein under load except as opposed by resilient connections between rims and hub comprising rubber bags filled with compressed air and attached to springy metal strips inserted in steel spring holders mounted on the confronting peripheries of the hub and rims, said outer plate being perforated for supplying through said perforations compressed air to said rubber bags, which are so mounted as to be easily removed and renewed when worn.

5. In a resilient compression air wheel made in two sections, a stationary and a movable one, a hub, a perforated sectional outer plate to which said hub is attached, an intermediate rim concentric to said hub and secured to said plate, an inner plate, an outer rim thereon carrying a tire, and an inner rim on said inner plate engaging in the space between said intermediate rim and the hub, said inner and outer rims and inner plate forming said movable section, an outer plate secured to the hub for holding said movable section in alignment with the hub, and forming together with the hub, the perforated sectional outer plate and the intermediate rim said stationary section, and a plurality of rubber bags of desired shape having at their sides openings for a supply of compressed air thereto, said openings being in communication with the perings of said sectional outer plate, said forations being arranged in close proximity to one another and between emergency springs and mounted on the confronting peripheries of the hub and rims to allow a relative movement of the movable and stationary sections, said sectional outer plate being made in parts to facilitate the renewal of said rubber bags when worn.

6. In a resilient compressed air wheel, an inner movable plate, an outer rim on said inner plate, a tire carried by said rim, an inner rim on said plate, a hub, a perforated sectional outer plate secured to said hub, an intermediate rim secured to said plate and concentrically arranged thereon with respect to the hub, an outer plate secured to the hub opposite to said perforated sectional outer plate, said outer plates and intermediate rim forming with the hub a chamber in which the inner rim is displaceable, and compressed air rubber bags mounted between the confronting peripheries of the hub and rims, having inlet valves at their sides in communication with the perforations of the perforated sectional outer plate, said valves to be closed after compressed air has been supplied to the rubber bags, and spring means between the rubber bags at intervals constituting further yielding connections between said confronting peripheries, the perforated outer plate being divided in parts to facilitate renewal of the rubber bags when worn.

MICHAEL D. SPIRIDI.